United States Patent [19]

Sills

[11] Patent Number: 4,827,391

[45] Date of Patent: May 2, 1989

[54] APPARATUS FOR IMPLEMENTING OUTPUT VOLTAGE SLOPE IN CURRENT MODE CONTROLLED POWER SUPPLIES

[75] Inventor: James G. Sills, Dallas, Tex.

[73] Assignee: Texas Instruments Incorporated, Dallas, Tex.

[21] Appl. No.: 200,999

[22] Filed: Jun. 1, 1988

[51] Int. Cl.⁴ ............................................. H02M 1/08
[52] U.S. Cl. ....................................... 363/41; 363/97
[58] Field of Search ................................. 363/19-21, 363/22-26, 41, 65, 71, 95, 97, 98; 307/51, 52, 82; 323/280

[56] References Cited

U.S. PATENT DOCUMENTS

| | | | |
|---|---|---|---|
| 4,133,025 | 1/1979 | Wurzburg | 363/41 |
| 4,281,374 | 7/1981 | Archer | 363/41 |
| 4,529,928 | 7/1985 | Rogers et al. | 323/280 |
| 4,649,467 | 3/1987 | Vesce et al. | 363/41 |

Primary Examiner—Peter S. Wong
Attorney, Agent, or Firm—Rene' E. Grossman; James T. Comfort; Melvin Sharp

[57] ABSTRACT

The disclosure relates to a system for implementing output voltage slope in current mode controlled power supplies wherein the slope is provided by feeding back the voltage analog of peak output current to an error amplifier which provides an error signal which is proportional to the difference between a reference voltage and the output voltage. The error amplifier includes a feedback path including a resistor from output to input to cause output voltage slope with increased current.

12 Claims, 2 Drawing Sheets

APPARATUS FOR IMPLEMENTING OUTPUT VOLTAGE SLOPE IN CURRENT MODE CONTROLLED POWER SUPPLIES

BACKGROUND OF THE INVENTION

1. FIELD OF THE INVENTION

This invention relates to power supplies and, more specifically, to a power supply composed of plural power supplies, connected in parallel, wherein each power supply may have a different output voltage caused by tolerances between supplies of the same type.

2. BRIEF DESCRIPTION OF THE PRIOR ART

Solid state radar systems and systems using very high speed integrated circuit (VHSIC) technology require power supplies which deliver low voltages and very high currents. An effective method of supplying such high currents is to operate several power supplies in parallel. In such systems, it is desirable for the parallel connected power supplies to share current equally in order to optimize feedback loop response and system reliability.

In general, any two power supplies of the same type, for example supply "A" and supply "B", as shown in FIG. 1 will have different output voltages which, without current sharing provisions, will cause a large imbalance of output current. The supply with the higher output voltage, for example supply "B", will source all the load current until it reaches current limit. After supply "B" goes into current limit and the output voltage drops to the regulation point of supply "A", supply "A" will start to supply current and thereby add some current to the load, sufficient to maintain the output voltage equal to the regulation voltage of supply "A". It can therefore be seen that connecting of plural power supplies in parallel, without other controls, results in the power supply of higher output voltage supplying most of the current to the system until current limit of that supply is reached and the output voltage drops to that of the power supply with next lower output voltage, whereupon the next lower output voltage power supply will commence supply of current to the system. This procedure continues in this manner when additional parallel connected power supplies are present. It is readily apparent that such operation will generally cause breakdown of the highest output voltage power supply prior to that of the other power supplies of the system.

The above described problem is known and several prior art procedures for solution thereof are known. One known solution to the problem of non-balanced output current is introduction of output voltage slope to balance the load current of parallel connected power supplies, which allows the output voltages of the power supplies to match without requiring one of the supplies to be in current limit. The industry has endeavored to provide such voltage slope using minimum power and/or circuitry and circuits therefor have been designed in the past.

In power supply systems wherein the individual supplies are not identical, the output current of the individual power supply with the higher output voltage will be higher than the individual power supply with the lower voltage by a fixed value delta I. For example, if the power supplies are 5 volt supplies with 1% total difference between output voltages and a delta I of 10 amps is desired, a slope of 5 mV/A will be required. Over an output current range from 0 amps to 40 amps, a slope of 5 mV/A corresponds to a load regulation of ±2%.

One prior art system for allowing the output voltage to drop off with increasing output current to provide such slope involves the placement of a resistor in series with the output of each of the individual power supplies. A problem with this procedure is that it is very dissipative due to the $I^2R$ losses developed in the resistor at the output. For example, if the output resistor is 5 milliohms and the output current is 40 amperes, the dissipated power is 8 watts. It is therefore readily apparent that a less dissipative system for providing the desired output voltage slope with increase in output current is required.

Ultimately, power supply voltage regulation is controlled by the error voltage, this being the output of the error amplifier. Feeding the voltage analog of the peak output current into the inverting input of the error amplifier will cause output voltage Vo of the system to decrease with increasing output current. The voltage analog of the power supply output current is a signal used to limit supply current and, as such, is already present in the power supply. Prior art derivation of the peak value of the voltage analog of the power supply output current requires peak detection circuitry which is unique to the programmed output slope. Peak detectors that are highly accurate and wide bandwidth are complicated, using many components. Reducing peak detector parts count sacrifices accuracy, bandwidth, or both. Traditionally, peak detectors have been added to power supply control circuits and the parts count-performance trade-off has been a problem.

SUMMARY OF THE INVENTION

In accordance with the present invention, the above noted problems of the prior art are minimized and the above noted desired result is achieved.

The power supply output slope is programmed by sampling a voltage analog of the peak output current at the output of the error amplifier and feeding this signal back into the negative input of the internal error amplifier. The error amplifier samples the power output voltage, compares it with a reference voltage applied to the positive input of the error amplifer, and provides therefrom the error voltage signal at the output of the error amplifier which signal is also fed to the pulse width modulator (PWM). The pulse width modulator compares the error voltage against a constant frequency voltage ramp. This generates a constant frequency PWM signal which is used to modulate the input power through a power switch and power transformer. After filtering, this PWM controlled input power provides the power supply output voltage.

In the current mode controlled power supply in accordance with the present invention, the peak output current signal is derived by an indirect method which requires the addition of a single small signal resistor. A resistor is added in the feedback loop from the output of the error amplifier back to the (−) input of the error amplifier and causes the output voltage slope at the output of the error amplifier, this resistor not being required for ordinary operation of the power supply. Conventional thinking would suggest that the addition of this resistor would severely degrade the line and load regulation of the power supply. In practice, it has been found that having this resistor in the feedback circuit of the error amplifier does not affect line regulation. However, load regulation is affected as demonstrated in accordance with the following equations, wherein:

Definitions:
Nt = Power Transformer turns ratio
Nc = Current Sense Transformer turns ratio
Io = Output Current
Iop = Peak Output Current
Ip = Power Transformer Primary Current
Is = Current Sense Current
Vi = Voltage Analog of Output Current
Vip = Voltage Analog of Peak Output Current, Error Voltage
Ri = Current Sense Resistor
Vref = Power Supply Reference Voltage Relationships:

$$Io = IpNt$$

$$Is = Ip/Nc$$

$$NcNt = N$$

$$Vi = IoRi/N$$

$$Vip = IopRi/N \tag{1}$$

$$Vr = Vref \tag{2}$$

The relationship (2), supra, is true by virtue of the negative feedback nature of the control loop. Equation (1), true by the nature of current mode control, states that the output voltage of the error amplifier is directly proportional to the peak output current. This is the key equation of this concept. The error voltage must be an accurate representation of peak output current. Equation (1) is valid as long as the output voltage of the power supply is being governed by the supply's control loops. An error amplifier equation is therefore written as:

$$(Vr-Vip)/(Vo-Vip) = Rs/(Rs+Rv)$$

After rearranging terms:

$$Vo = Vr[(Rs+Rv)/Rs] - Vip[(Rs+Rv)/(Rs-1)]$$

Substituting for Vip yields:

$$Vo = Vr[(Rs+Rv)/Rs] - (IopRi/N)(Rv/Rs$$

$$\Delta Vo = -\Delta Io(Ri/N)(Rv/Rs) \tag{3}$$

It can be seen from the above that the addition of resistor Rs (resistor 6 in FIG. 2) to the circuit, which is the above noted single small signal resistor, causes the output voltage to change with output current as predicted by equation (3). This is the characteristic output voltage slope that is instrumental in causing power supplies operating in parallel to current share.

Using the error voltage as the voltage analog of peak output current is advantageous because the signal is already present in current mode controlled supplies and only one small signal resistor is required to program the necessary output voltage slope. This method is also valuable because there is no performance sacrifice when compared to other methods of causing output voltage slope.

DESCRIPTION OF THE PREFERRED EMBODIMENT

Figure 2:
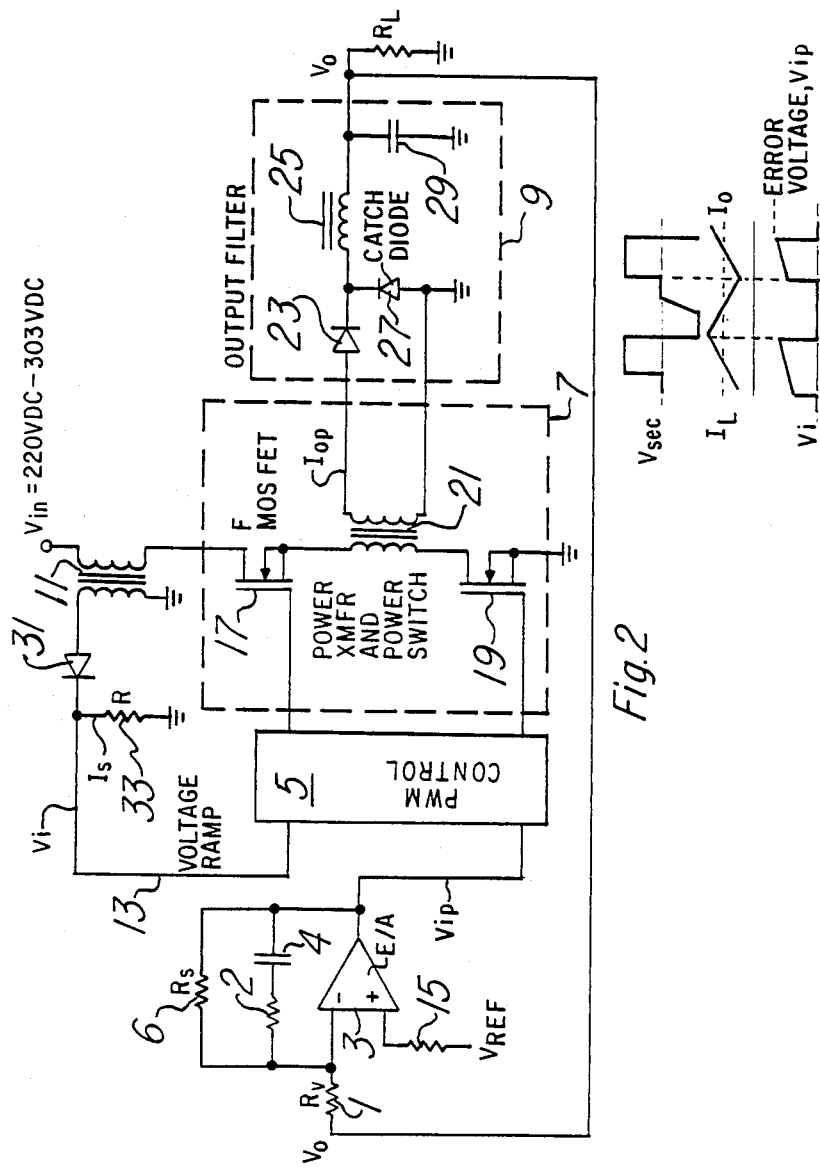
FIG. 2 is a semi-schematic circuit diagram of a preferred embodiment of a circuit in accordance with the present invention.

Referring now to FIG. 2, there is shown a partial schematic and partial block diagram of a power supply in accordance with the present invention, the circuit being designed to compensate for changes in current.

The input to the power supply circuit is the voltage Vin. Vin is generated, for example, from an aircraft alternator and is a constant voltage source, generally within 220 to 303 volts DC. The output of the power supply circuit is the voltage Vo, this voltage being fed back to the negative input of the error amplifier 3 through an input resistor 1. The other input to the positive input terminal of error amplifier 3 is the power supply reference voltage Vref which is provided via resistor 15, this input being voltage related to the desired error amplifier output Vip. The output of the error amplifier 3 is the error voltage or voltage analog of the peak output current of the power supply, this error voltage being representative of the difference between Vref and the input to the other input terminal of the error amplifier.

The output of error amplifier 3 is fed back to the negative input thereof via a first circuit composed of a resistor 2 and capacitor 4 in series therewith. In addition, a relatively small value resistor 6 is connected in parallel with the series circuit of resistor 2 and capacitor 4. This one small value signal resistor 6 is utilized herein to provide the function of either the peak detector or the high value load resistor in the signal path of the prior art as discussed hereinabove.

Figure 1:
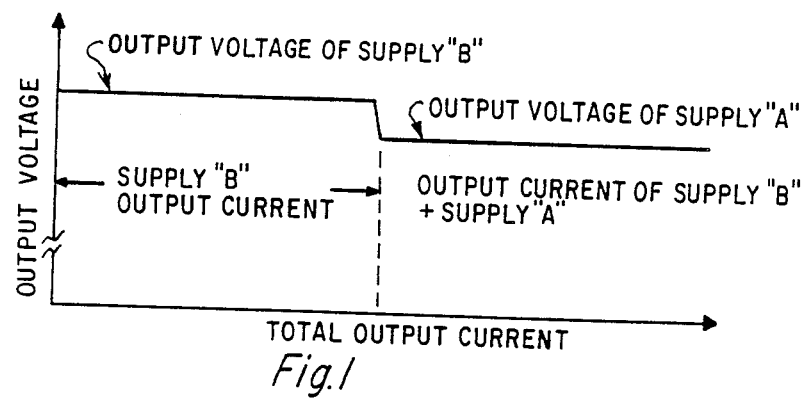
FIG. 1 is a diagram of output voltage as a function of total output current for two power supply units connected in parallel without current sharing mechanism.
Figure 3:
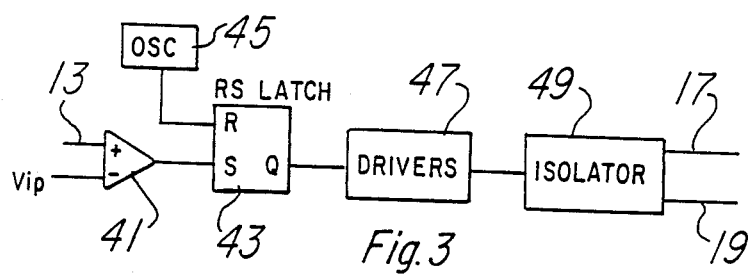
FIG. 3 is a block diagram of a typical circuit representing the contents of the PWM controller 5 of FIG. 2.

The pulse width modulator (PWM) control circuit 5, is generally a comparator circuit as shown in FIG. 3 comprising a comparator 41 which drives the S input of an RS latch circuit 43. The comparator 41 compares the error voltage Vip against a constant frequency voltage ramp 13, which is the voltage analog of the charging current in inductor 25, to provide its output to the S input of the latch 43. An oscillator 45 provides the other input to the latch circuit 4 at its R input. The Q output of the latch 43 passes through drivers 47 and an isolator 49 to provided a constant frequency PWM signal. This signal is used to modulate the input power through the power modulator power switch and power transformer 7 which is generally composed of a pair of power FETs 17 and 19 coupled together by one winding of a power transformer 21.

The output at the secondary of the power transformer 21 is a voltage with the peak output current of the amplifier Iop. This voltage is filtered by the output filter 9, composed of a series diode 23 and inductor 25 coupled to the amplifier output with a catch diode 27 coupled between the junction of the diode 23 and inductor 25 to ground and a capacitor 29 from the system output to ground. This provides a DC voltage Vo at the output. Also, the current, Il through the inductor 25 of the filter 9 has some DC value and undergoes a charge and discharge, this being reflected back through the power transformer 21 and also through the current sense transformer 11 to provide the ramp voltage Vi and current Is via diode 31 and resistor 33.

The PWM control 5 compares the voltage ramp signal Vi from the current sense transformer 11 with the output of the error amplifier 3. When the two voltages are equal, the power switches 17 and 19 in the circuit 7 are turned off to end a charging cycle.

Initially, the power switches 17 and 19 are turned on by the PWM controller 5, the latter doing so because the output voltage Vip is higher than the voltage ramp 13 voltage. This is because only the Vref signal is fed into the error amplifier 3, causing the output thereof to go higher, thereby turning on the comparator or PWM controller 5, this turning on the two power switches 17 and 19 which operate in phase.

The current will now begin to charge up in the inductor 25 of the output filter 9. Also, current is provided in the secondary of the current sense transformer 11 due to to closing of the path from Vin to ground, this current being converted to a voltage Vi by resistor 33 in the secondary circuit of the current sense transformer 11, the voltage Vi tracking the current Il through the inductor. The voltage Vi will continue to rise until the switches 17 and 19 are turned off. When Vi has increased to the value of the error voltage Vip at the output of the error amplifier 3, the output of the PWM controller 5 goes to zero and turns off the switches 17 and 19, causing the inductor 25 to begin to discharge through the load resistance $R_L$ and catch diode 27. The voltage at the output Vo remains fairly constant and changes slowly over a period of several cycles. As a higher voltage is fed into the negative input of the error amplifier, it causes the voltage at the output Vo to drop off by causing the pulse width to narrow. This is caused due to the shorter charging period.

It can be seen that the error voltage Vip is analogous to the peak output current because, when signal 13 (the voltage analog of the current during the charging period of inductor 25) reaches the value of Vip (equal to or greater than Vip) power FETs 17 and 19 are turned off. As soon as power FETs 17 and 19 are off, the current in inductor 25 starts to decrease. Therefore Vip must be the voltage analog of the peak current.

It can therefore be seen that, in accordance with the present invention, the complex and/or highly dissipative circuits of the prior art have been replaced by a single strategically placed resistor to provide the same results as obtained by these prior art circuits.

Though the invention has been described with respect to a preferred embodiment thereof, many variations and modifications will immediately become apparent to those skilled in the art. It is therefore the intention that the appended claims be interpreted as broadly as possible in view of the prior art to include all such variations and modifications.

I claim:

1. A system for implementing output voltage slope in current mode controlled power supplies composed of plural power supply devices connected in parallel, comprising:

(a) a power supply device having an input terminal and an output terminal for receiving an input signal at said input terminal and providing an output signal at said output terminal, (b) first circuit means coupled between said input terminal and said output terminal of said power supply device comprising control means under control of said input signal at said input terminal, and (c) second circuit means coupled between said output terminal and said control means of said power supply device comprising comparison means having first and second inputs and an output, said first input being coupled to a predetermined reference voltage source, said second input being coupled to said output terminal of said power supply device and a feedback circuit coupled between said output of said comparison means and said second input including an RC circuit and a resistor in parallel with said RC circuit.

2. A system as set forth in claim 1 wherein said second circuit includes resistance means coupled between said output of said power supply device and said second input.

3. A system as set forth in claim 2 wherein said predetermined reference voltage is a constant voltage.

4. A system as set forth in claim 3 wherein said first circuit means comprises a transistor having a current path and a control electrode, said current path being coupled to said input of said power supply device and means responsive to a ramp voltage and said output of said comparison means to control said transistor.

5. A system as set forth in claim 4, further including means controlled by said input signal to provide said ramp voltage.

6. A system as set forth in claim 2 wherein said first circuit means comprises a transistor having a current path and a control electrode, said current path being coupled to said input of said power supply device and means responsive to a ramp voltage and said output of said comparison means to control said transistor.

7. A system as set forth in claim 6, further including means controlled by said input signal to provide said ramp voltage.

8. A system as set forth in claim 1 wherein said predetermined reference voltage is a constant voltage.

9. A system as set forth in claim 8 wherein said first circuit means comprises a transistor having a current path and a control electrode, said current path being coupled to said input of said power supply device and means responsive to a ramp voltage and said output of said comparison means to control said transistor.

10. A system as set forth in claim 9, further including means controlled by said input signal to provide said ramp voltage.

11. A system as set forth in claim 1 wherein said first circuit means comprises a transistor having a current path and a control electrode, said current path being coupled to said input of said power supply device and means responsive to a ramp voltage and said output of said comparison means to control said transistor.

12. A system as set forth in claim 11 further including means controlled by said input signal to provide said ramp voltage.

* * * * *